United States Patent [19]
Giang et al.

[11] Patent Number: 5,950,928
[45] Date of Patent: Sep. 14, 1999

[54] MULTI-CHAMBER DISPENSING ASSEMBLY

[75] Inventors: Quang Giang, 1606 18th St., Niceville, Fla. 32578; Everett B. James, Jr., Panama City, Fla.

[73] Assignee: Quang Giang, Niceville, Fla.

[21] Appl. No.: 09/072,639

[22] Filed: May 4, 1998

[51] Int. Cl.[6] .............................. B05B 7/24; B05B 15/06
[52] U.S. Cl. ...................... 239/304; 239/318; 239/279; 222/144.5
[58] Field of Search ..................... 239/303–305, 239/318, 273, 279; 222/144.5; D23/214, 228, 207

[56] References Cited

U.S. PATENT DOCUMENTS

| | | | |
|---|---|---|---|
| D. 236,616 | 9/1975 | Stucky | 239/304 X |
| 5,806,769 | 9/1998 | Womack | 239/273 X |
| 5,816,502 | 10/1998 | Sperry et al. | 239/304 |

*Primary Examiner*—Lesley D. Morris
*Attorney, Agent, or Firm*—William B. Noll

[57] ABSTRACT

Disclosure is directed to two preferred embodiments for a multi-chamber dispensing apparatus, particularly useful for home owners, for dispensing one or more different water transmittable products. The apparatus, to work in conjunction with conventional hose sections, includes plural chambers, each with a metering valve to adjust the flow of product from the respective chambers. One or more of the metering valves may be opened to effect a mixing of product, if desired.

13 Claims, 8 Drawing Sheets

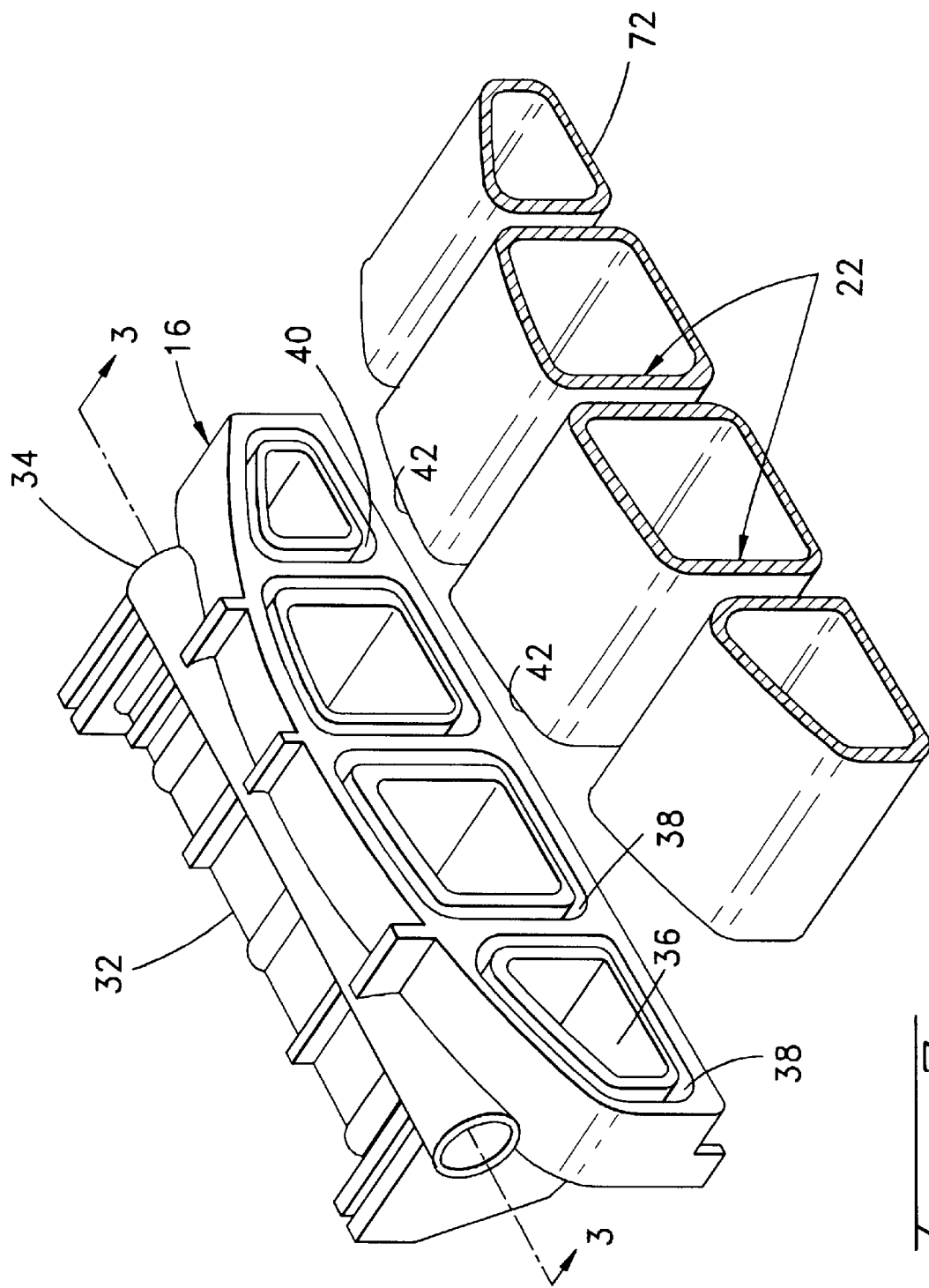

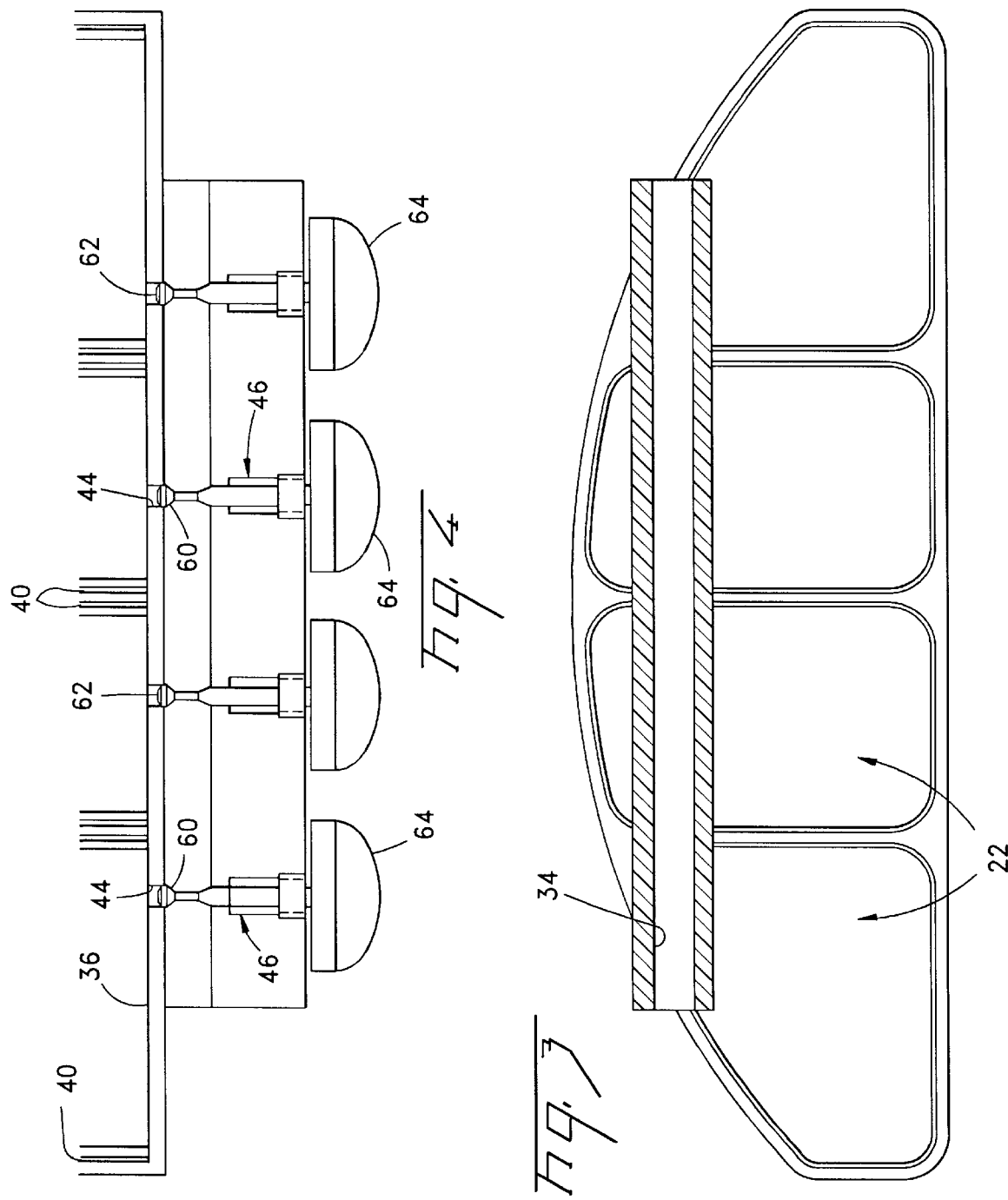

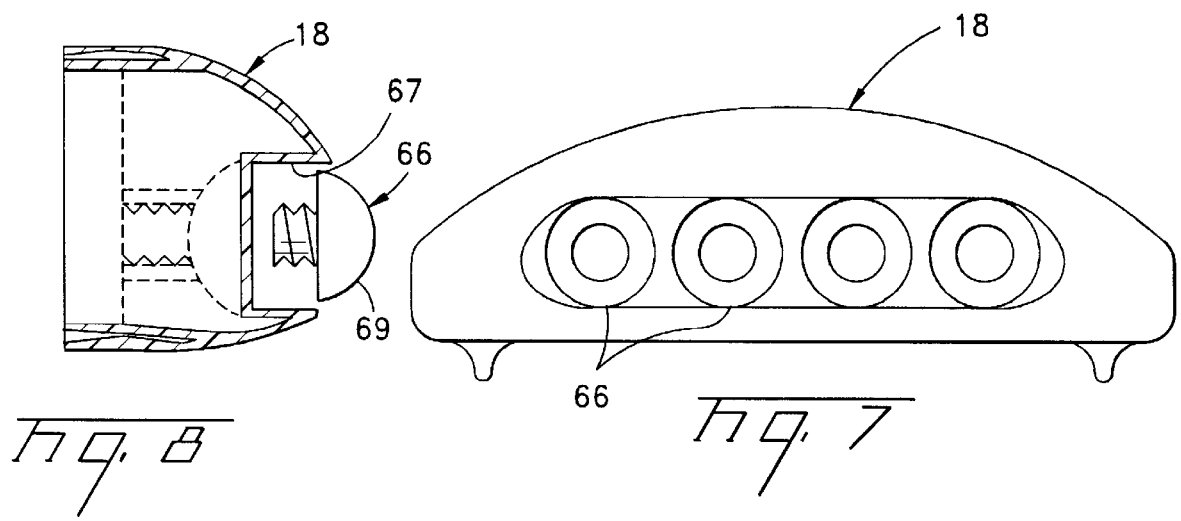
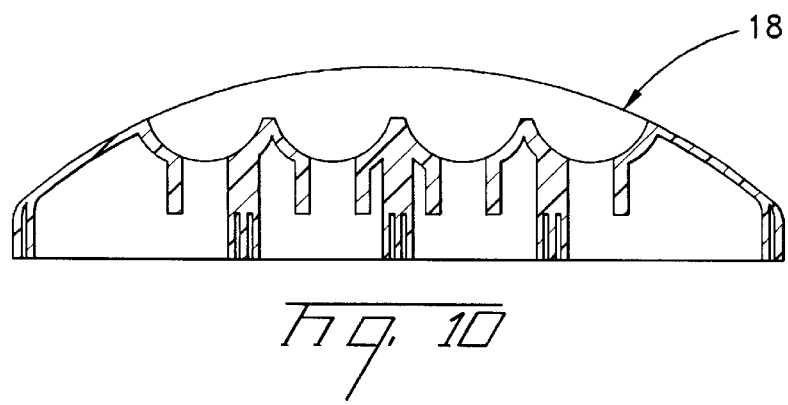
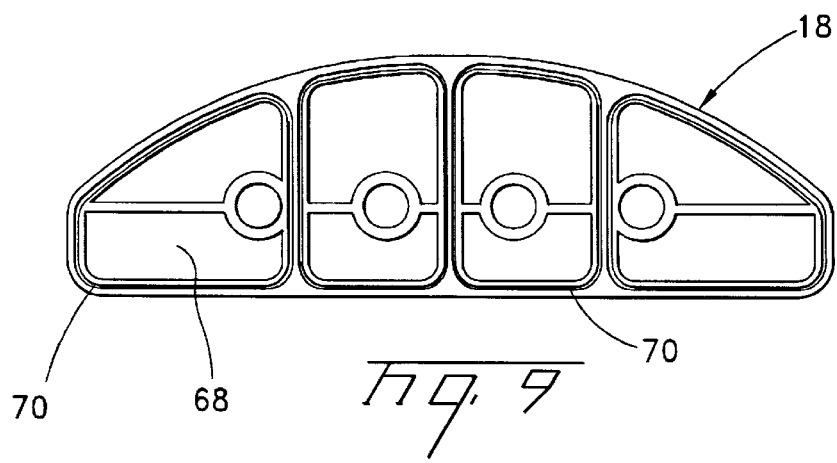

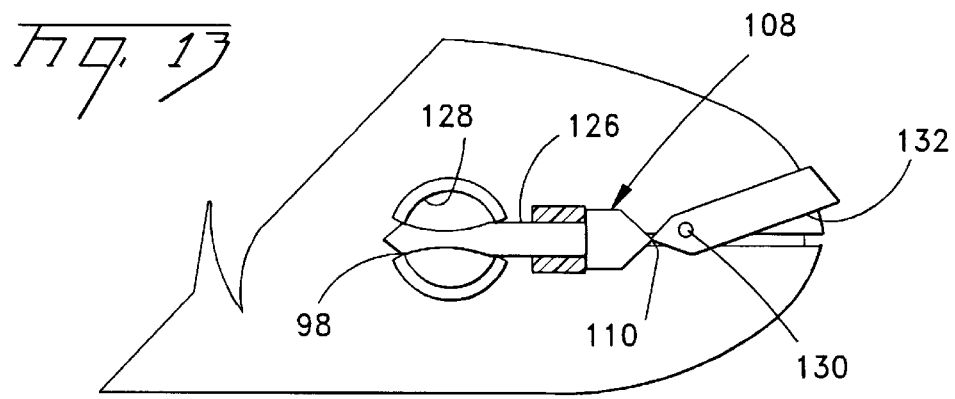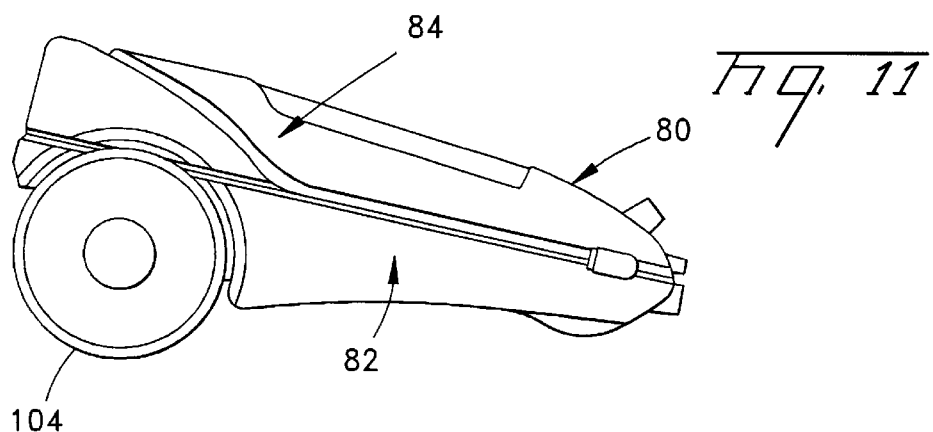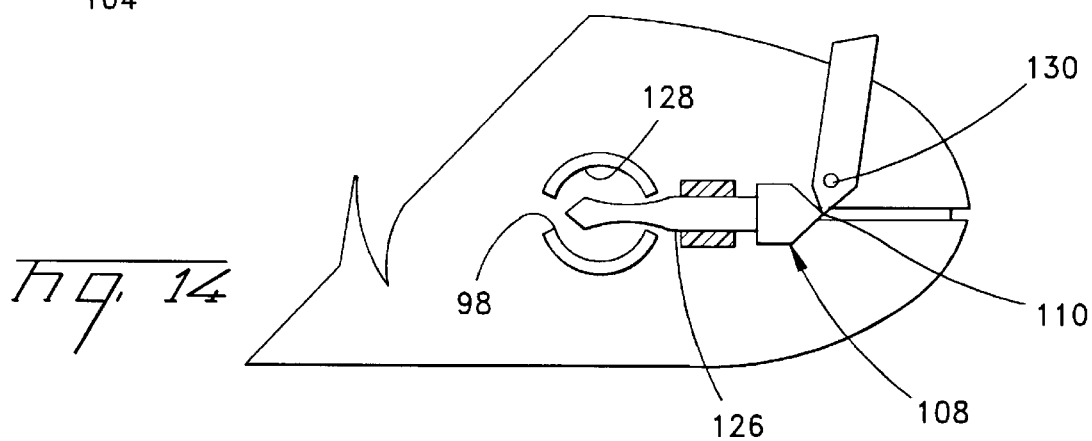

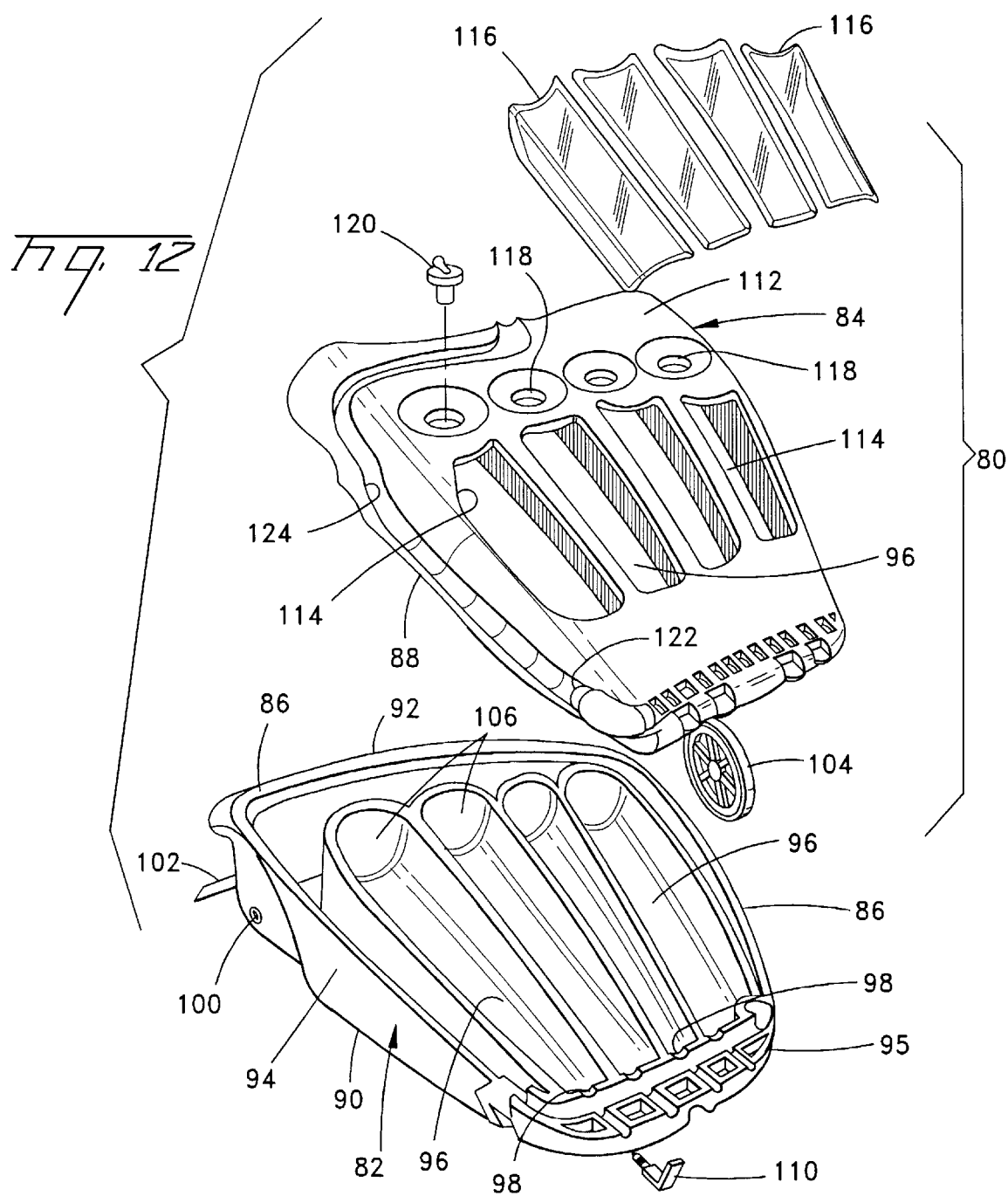

5,950,928

MULTI-CHAMBER DISPENSING ASSEMBLY

FIELD OF THE INVENTION

The present invention is directed to the field of fluid dispensing systems such as may be used in conjunction with a garden hose in various and diverse outdoor applications, such as for fertilizing and cleaning, by way of example.

BACKGROUND OF THE INVENTION

The invention relates to a multi-chamber dispensing assembly for dispensing a number of different products, or even a combination of products, for diverse applications. The best that the prior art has to offer is a single product dispensing applicator. A currently available, single dispensing device is marketed under the trademark, NO-CLOG 4 in 1, as a lawn and garden feeder. The device is distributed by Scott Miracle-Gro Products, Inc. of Port Washington, N.Y. The device further appears to be covered by two national patents, U.S. No. D-322,836 and Canada No. 1271501. Such device, as distributed, comprises ajar for receiving a water soluble lawn or garden feed, and a cover threadably secured to the jar. The cover includes an input garden hose connection, a flow/no flow valve, and a dispensing nozzle. With the hose in the water transmitting mode, and the valve open, the dissolved feed is metered into the flow of water to be dispensed through the nozzle. The device thereof is designed for dispensing a single product. To dispense a different product, the jar must be removed, along with its contents, and refilled with the different product.

This prior art device offers neither the convenience nor flexibility that is often needed by a home owner whose time may be limited for outdoor chores, such as fertilizing the yard, feeding the vegetable garden, washing or waxing the car, or even power washing the house. The manner by which the present invention brings convenience and flexibility to home owners, or other users of the assembly hereof will become apparent to those skilled in the art from the following specification, particularly when read in conjunction with the accompanying drawings.

SUMMARY OF THE INVENTION

This invention relates to a multi-chamber dispensing system, such as may be used by a home owner to perform a variety of outdoor chores from fertilizing a lawn to washing an automobile. The sytem, of which two preferred embodiments are disclosed, is intended to operate in conjunction with a pair of conventional garden hose sections, and comprises a housing having a manifold housing section, a second housing section, and a plurality of product receiving chambers extending between the respective housing sections. The manifold housing section includes nozzle connections for the pair of conventional garden hose sections, and a valve assembly associated with each chamber to individually access, or to access two or more chambers, whereby to allow product to be dispensed therefrom. The second housing section includes plural, closable access ports, one associated with each chamber, to facilitate loading product into the respective chambers.

Accordingly, an object of this invention is to provide flexibility to the user thereof where time is limited to perform a variety of diverse tasks.

A further object hereof is to provide a user of the system the opportunity to quickly switch from one dispensing product to another Still another object of this invention is to provide a dispensing system with separate reservoirs for dispensable products while allowing the user to combine, for a specific task, plural products into a common dispensing stream of water.

The present invention offers a number of product dispensing alternatives to a user performing outdoor chores that are not available to the user of the Miracle-Gro single product dispenser of the prior at These and other objects may be readily gleaned from the specification which follows.

BRIEF DESCRIPTION OF DRAWINGS

FIG. 2 is an exploded, perspective view illustrating a first housing section and four product containing chambers spaced therefrom.

FIG. 3 is a transverse sectional view taken along line 3—3 of the fit housing section of FIG. 2.

FIG. 4 is a partial, horizontal sectional view of the first housing section of FIG. 2, further showing plural valve means for accessing one or more of the product containing chambers of FIG. 2.

FIG. 7 is an outside end view of a second housing section, showing plural access parts in accordance with the present invention.

FIG. 8 is an axial sectional view taken through one of the access ports of FIG. 7.

FIG. 9 is an inside end view of the second housing section, showing the alignment of the access ports to the respective product containing chambers.

FIG. 10 is a horizontal sectional view taken through the second housing section.

FIG. 11 is a side view of a second embodiment for the multi-chamber dispensing assembly of this invention illustrating a housing formed of a base and an upper housing section containing the covers for the plural chambers and product metering means for the respective chambers.

FIG. 12 is a partial, exploded perspective view of the second embodiment of FIG. 11.

FIG. 13 is a side view of a modified product metering and dispensing valve for the second embodiment, in a closed position, which valve incorporates a living hinge to effect axial movement of the valve stem thereof.

FIG. 14 is a side view, similar to FIG. 13, showing the valve in an opened position.

DETAILED DESCRIPTION OF PREFERRED EMBODIMENT

Figure 1:
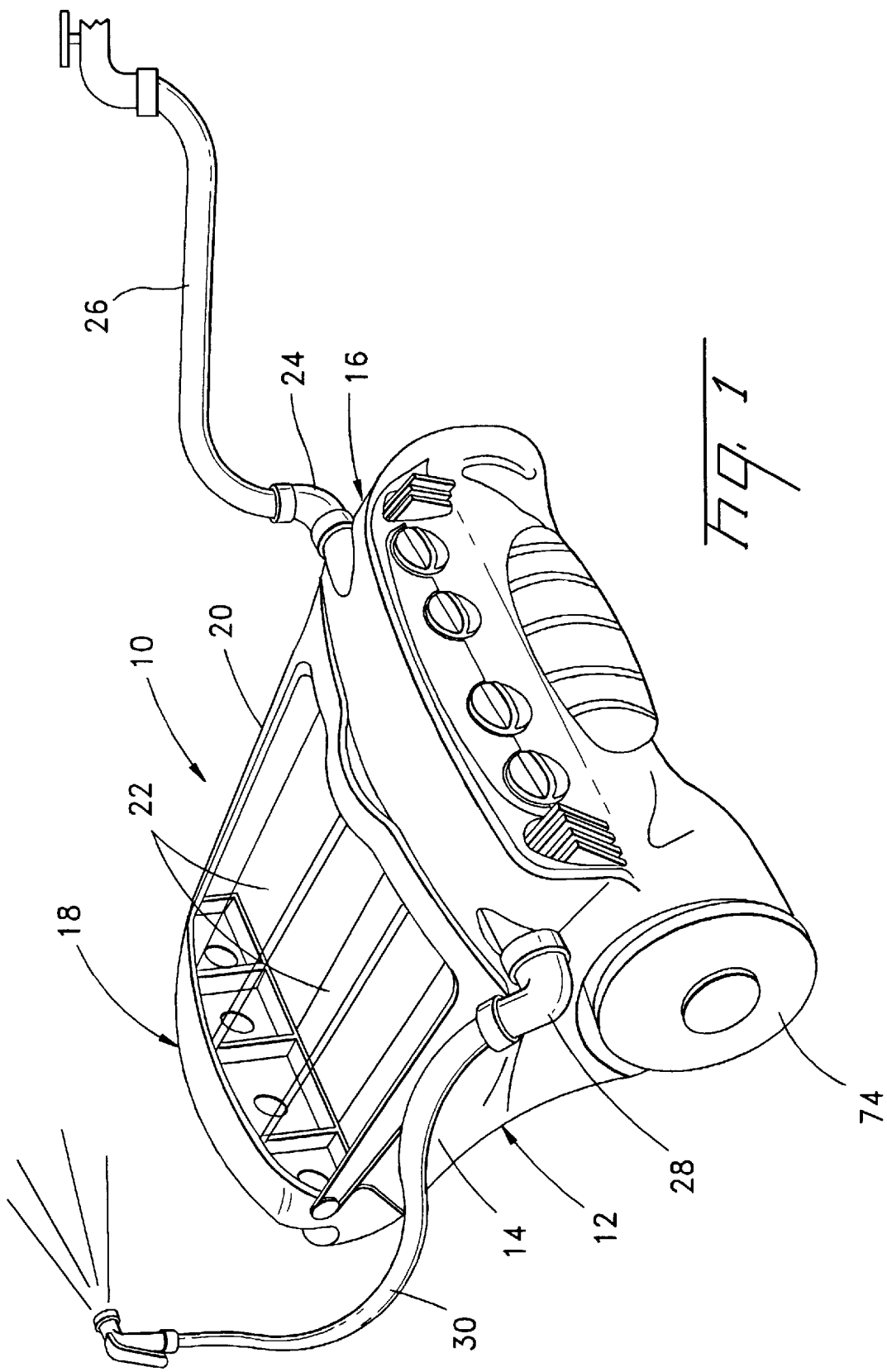
FIG. 1 is a top perspective view of the multi-chamber, dispensing system in accordance with the present invention, showing a base, first and second housing sections, and plural product containing chambers extending between the respective housing sections.

This invention relates to a multi-chamber dispensing system for dispensing a water soluble product or products in conjunction with a pair of conventional garden hose sections, where two preferred systems are as illustrated in the several Figures. In the several views, like reference numerals represent like components or features throughout the various Figures.

FIG. 1 is a perspective view of one embodiment for the dispensing system 10 hereof, where such system is a cradle-like housing 12 comprising a base 14, first and second housing sections 16, 18 upstanding therefrom, and an intermediate section 20 containing plural product dispensing chambers 22, preferably transparent, such as a clear plastic, extending between the respective housing sections, and in communication therewith, to be described in more detail hereafter. The first housing section 16 includes a pivotally mounted, fist hose connection 24, for receiving water transmitted through a conventional garden hose section 26, and a pivotally mounted, second hose connection 28 for transmitting water containing product, through a second conventional garden hose section 30, to a remote location.

The first said housing section 16, as illustrated in more detail in FIGS. 2 through 4, includes a manifold 32 (upper component of FIG. 2), a transverse conduit 34 in fluid communication with the respective pivotal hose connections 28, 30, and an inner face 36 featuring plural chamber recesses 38. Each said recess 38 is defined by a continuous annular slot 40 sized to slidably receive a first end 42 of a respective product dispensing, elongated chamber 22, to thereby provide a water tight seal between the housing section 16 and chambers 22.

Figure 6:
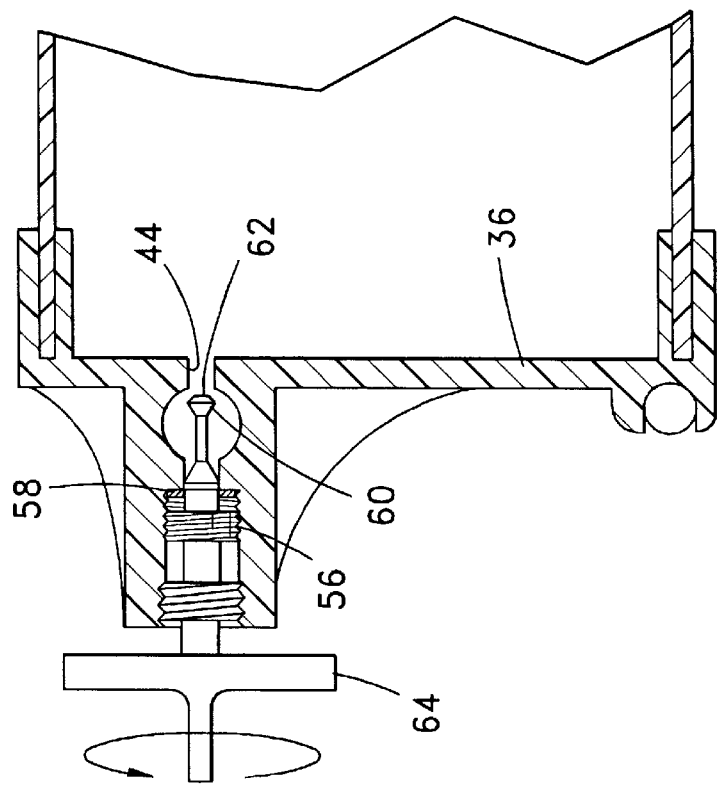
FIG. 6 is a sectional view, similar to FIG. 5, showing the valve means in an open or dispensing position.
Figure 5:
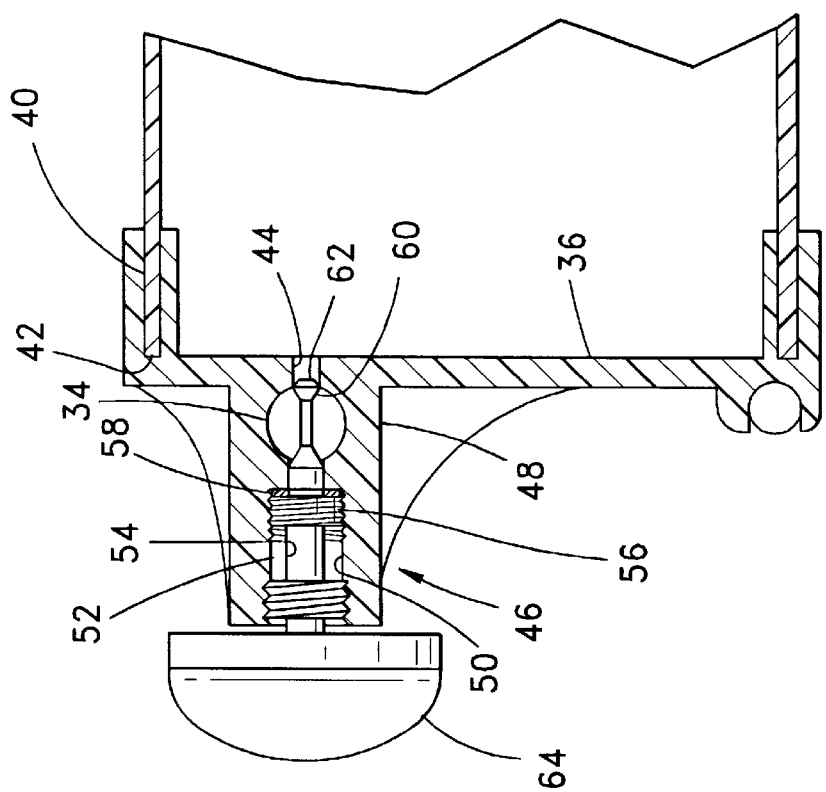
FIG. 5 is a partial enlarged sectional view taken through one of the valve means showing such valve means in a closed or non-dispensing position.

At selected locations along the transverse conduit 34, closable ports 44 are provided to allow metering of product from one or more chambers 22 into the transverse conduit 34. FIGS. 4 through 6 illustrate the manner by which the ports 44 may be opened or closed, as desired, or set to some intermediate position to effect a controlled metering of the product. FIG. 5 illustrates a valve assembly 46 mounted within an outer wall 48 of first housing section 16, which further includes the transverse conduit 34. The outer wall 48 includes a recess 50 within which is fixedly mounted a self tapping valve seat 52, such as may be machined from brass, having a central bore 54 for threadably receiving a rotatable needle valve 56, and a sealing gasket 58. The needle valve 56 is characterized at its distal end 60 by a tapered portion 62 to seal or close-off the port 44. FIG. 6 shows an open port 44, where the distal end 60 has been axially withdrawn by rotating the valve knob 64. By this action, the user of the system 10 can readily control and meter the contents of one or more chambers into the transverse conduit 34, and thence into the second hose connection 28.

FIGS. 7 through 10 illustrate various views of the second housing section 18. FIG. 7, for example, shows an outside end view, where plural closure valves 66, one for each chamber 22, are illustrated. The several and independent closure valves 66, which may be recessed 67, represent a convenient means to replentish or empty a selected chamber. Simply by turning the valve head 69, protected by the recess 67, the user can easily access the desired chamber 22. As best seen in FIGS. 8 and 9, the housing section 18 is characterized by plural chamber recesses 68, where each said recess 68 is defined by a continuous annular slot 70 for slidably receiving the opposite end 72 of the elongated chamber 22, see FIG. 2. FIG. 9 shows an inside end view as it would appear to the several chambers 22 before engagement therewith into the annular slots 70.

The plural product dispensing chambers 22, as best seen in FIG. 2, though they may vary from one another in shape, are each characterized by a generally uniform cross section throughout their respective lengths, and are preferably transparent to allow the user thereof to see the dissolved product. These cylindrical-like tubes, when joined to the first and second housing sections 16, 18, define water-tight chambers for receiving selected water soluble products.

To enhance the mobility of the system of this invention, a par of axle-mounted wheels 74 may be secured along the base 14, for example, by means known in the art, or as illustrated hereafter.

A second preferred, and more compact embodiment is illustrated in FIGS. 11 through 15. The second embodiment 80, a side view of which is shown in FIG. 11, comprises a pair of shell sections 82, 84, preferably injection molded from plastic. As best seen in the exploded perspective view of FIG. 12, the respective shell sections 82, 84, include continuous peripheral rims 86, 88, respectively, where such shell sections may be fixedly secured to one another, about the periphery, by sonic welding, a known practice in the art for joining mating plastic parts.

The lower shell section 82 includes a base 90, a back wall 92, side walls 94, and a front manifold section 95. Additionally, upstanding from the base 90 are plural troughs 96, where such troughs define three walls of the product dispensing chambers. Opening into the front manifold section 95, from the respective troughs 96, are plural ports 98, one for each trough 96. As best seen in FIG. 12, the side walls further include aligned openings 100, only one being shown, for receiving an axle 102, and a pair of conventional wheels 104, again only one being illustrated in FIG. 12. By the construction of the base 90, the axle 102 may be conveniently inserted through the respective side walls behind the rear walls 106 of the plural troughs 96.

As will be made clearer later, particularly in the discussion of FIGS. 13 and 14, the lower shell section 82 may include plural valve assemblies 108, each featuring a living hinge 110 to activate the respective valve assemblies.

The upper shell section 84, includes a top 112 having plural, elongated openings 114, each opening aligned with a respective trough 96, for receiving a transparent, comparably configured panel 116, such as made from clear plastic, which may be sonically welded therewithin to provide an integral unit. Additionally, overriding each trough 96, is a funnel-shaped, refill port 118 which threadably receives a complementary closure member 120. With the respective shell sections 82, 84, engaged in the manner described above, an integral assembly with plural, visually accessible chambers is provided. Additionally, the upper shell section includes a water entry port 122, and a convenient means in the form of an extended slot 124, to position a garden hose section (not shown).

Figure 15:
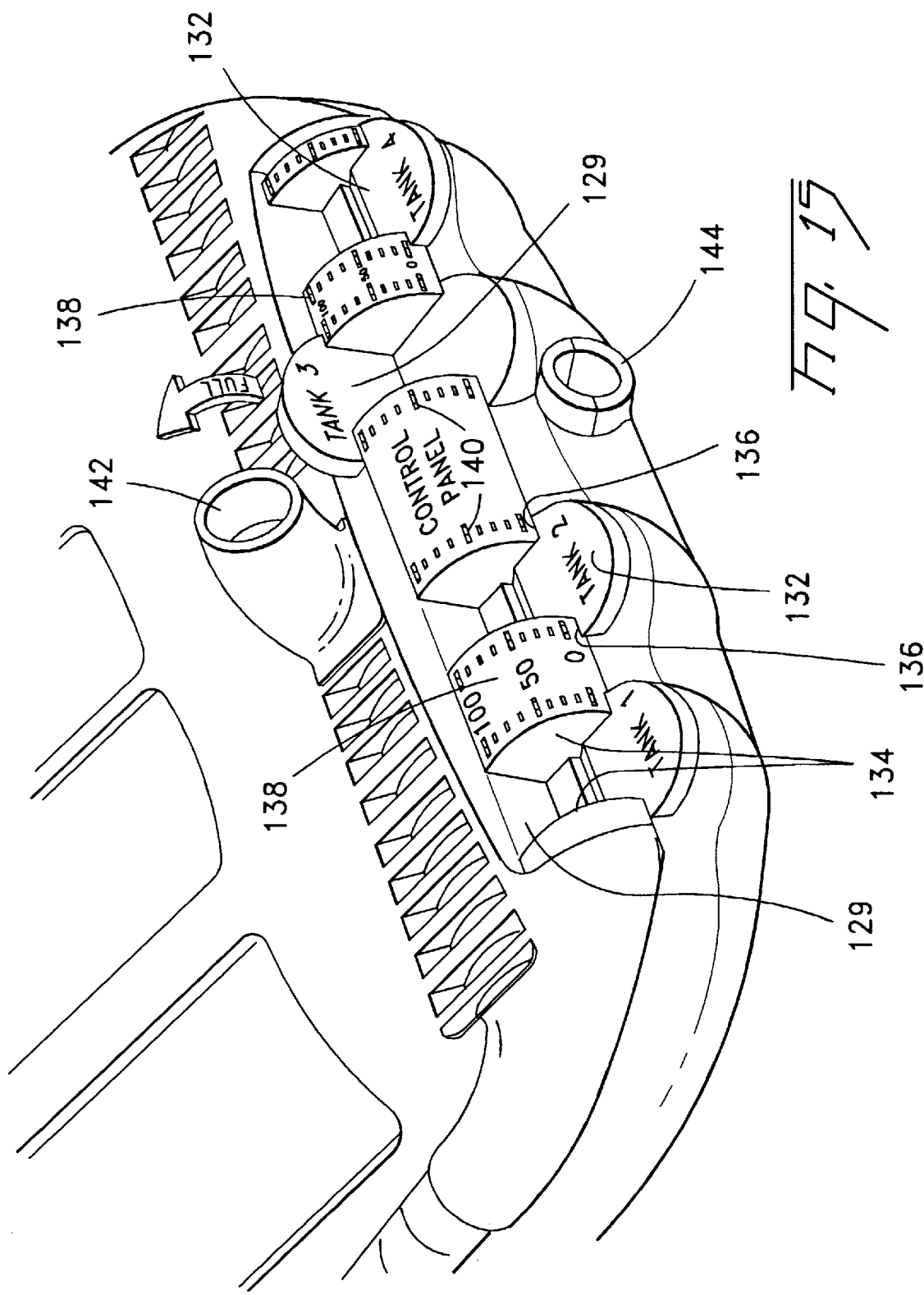
FIG. 15 is an enlarged perspective view illustrating details of the several valve systems hereof, further showing an exemplary means for attaching a handle thereto to enhance the mobility of the assembly of this invention.

FIGS. 13 through 15 illustrate further details of the modified valve assemblies 108 for this second embodiment. With this valve assembly 108, and the valve assembly for the first embodiment, each operate on the principal of an axially movable valve stem. In the latter embodiment, the valve stem 126, extending through the transverse manifold conduit 128, projects into and closes off the dispensing port 98, FIG. 13. By providing the pivot point 130, offset from the living hinge 110, pivoting of the handle 132 allows the valve stem 126 to move axially, i.e. withdrawn, to open the dispensing port 98 to effect controlled metering of product within the selected chamber or trough 96, FIG. 14.

FIG. 15 illustrates further details of the front manifold section 95, particularly the control panel for the respective valve assemblies. The control panel is divided into plural recesses 129, where each said recess receives a pivoting handle 132 part of the valve assembly 108. Each recess is defined by a pair of spaced-apart walls 134 between which the handle 132 may slide. The handle 132, preferably including a pair of laterally extending wings 136, overrides a curved wall 138 extending between the respective recesses. The curved walls 138, underlying the wings 136, may be embossed 140, with appropriate sequential numerical indicia associated therewith, whereby the respective wings 136 slide in contact with the raised embossments to identify to the user the degree of the port opening, and hence the degree of dispensing. That is, the valve assembly 108, by selective movement of the handle 132, can meter the quantity of dispensing product through a range of "0" to "100%".

Further, though a handle has not been illustrated, a handle receptable 142 may be provided along the face of the manifold section 95. By this convenient expedient, coupled with the wheels 104, the assembly of this invention may be readily transported by the user thereof to a different location. Finally, an exit hose connection 144 is provided to dispense the metered product to a remote location, as directed by the user.

While several embodiments have been described above, it is recognized that variations may be had with respect to the components of the respective embodiments for a multi-chamber product dispensing assembly, such as, for example, in the details of the valve assemblies, whether they be axially or angularly aligned to the respective chambers. Therefore, while the invention has been disclosed in preferred and alternate forms only, it will be obvious to those skilled in the art that many additions, deletions and modifications can be made therein without departing from the spirit and scope of this invention, and that no undue limits should be imposed thereon except as set forth in the following claims.

We claim:

1. A multi-chamber dispensing apparatus, in combination with a conventional garden hose, for dispensing one or more different water transmitted products, said dispensing apparatus comprising a multi-chamber, cradle-like housing including a base, a first housing section, a second housing section, and a plurality of product receiving chambers overriding said base and extending between the respective housing sections;

said first housing section including a manifold, and first and second hose nozzle means incorporated into said manifold, where a first said means is for accessing a flow of water to said manifold, and a second said means is for transmitting water containing product to a remote location, said manifold further including valve means for individually accessing each said chamber to allow product to be dispensed therefrom;

said second housing section including plural access ports, one communicating with each said chamber for adding product thereto, and removable means to close said access ports; and at least a pair of roller members mounted to said base to facilitate movement of said housing.

2. The multi-chamber dispensing apparatus according to claim 1, wherein said first housing section further includes a transverse conduit extending between said first and second hose nozzle means, and plural open ports, where each said open port extends between a given said chamber and said conduit.

3. The multi-chamber dispensing apparatus according to claim 2, wherein said valve means are operable to selectively control or prevent dispensing of product through said open ports.

4. The multi-chamber dispensing apparatus according to claim 3, wherein said valve means comprise plural rotative valve stems operable to move axially toward and away from said open ports.

5. The multi-chamber dispensing apparatus according to claim 1, wherein said first and second nozzle means include pivoting elbow members.

6. The multi-chamber dispensing apparatus according to claim 4, wherein said each said valve means is fixedly secured within said manifold housing section, and that each said valve stem is movable relative to said manifold housing section toward and away from said chambers.

7. The multi-chamber dispensing apparatus according to claim 6, wherein said valve stem is in fluid communication with said nozzle means.

8. A multi-chamber dispensing apparatus for interconnecting with a pair of garden hose sections for dispensing one or more different water transmitted products, said apparatus comprising a multi-chamber, mobile housing formed by first and second mating shell sections, a.) a first said shell section including a pair of connection means for said pair of garden hose sections, a transverse conduit extending between said connection means, and a base having plural upstanding walls to define plural troughs in a generally parallel relationship, where each said trough includes a port in fluid communication with said transverse conduit, said first shell section further including an externally accessible valve means for each said port, whereby to meter product from said troughs; and b.) a second said shell section to override and mate with said first said shell section, where said second shell section includes a top having plural transparent panels, at least one for each said trough, said top and panels further functioning to contain said troughs into plural water tight chambers, and plural access ports along said top to access each said chamber.

9. The multi-chamber dispensing apparatus according to claim 8, wherein said first shell section mounts a pair of wheels to enhance the mobility of the apparatus.

10. The multi-chamber dispensing apparatus according to claim 8, wherein said valve means comprises a lever mounted living hinge to effect the axial movement toward and away from said ports.

11. The multi-chamber dispensing according to claim 10, wherein said lever is partially recessed along an end face of said first shell section, where said face is embossed to allow each said lever to incrementally move within said recess along an arc, and that indicia are provided in association with said embossments to identify the degree of metering by each said valve means.

12. The multi-chamber dispensing apparatus according to claim 10, wherein each said valve means is fixedly secured wit said first shell section, and that each said valve means includes a valve stem movable relative to said first shell section toward and away from said port.

13. The multi-chamber dispensing apparatus according to claim 10, wherein said valve stem extends through said transverse conduit.

* * * * *